US011480677B2

(12) United States Patent
Smith et al.

(10) Patent No.: US 11,480,677 B2
(45) Date of Patent: Oct. 25, 2022

(54) TOOL FOR APPLYING A PROTECTIVE FILM TO A LENS OF A LIDAR SENSOR

(71) Applicant: GM GLOBAL TECHNOLOGY OPERATIONS LLC, Detroit, MI (US)

(72) Inventors: Anthony L. Smith, Troy, MI (US); Adam L. Wright, Farmington Hills, MI (US); Nathaniel W. Hart, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 763 days.

(21) Appl. No.: 16/420,942

(22) Filed: May 23, 2019

(65) Prior Publication Data
US 2020/0371234 A1 Nov. 26, 2020

(51) Int. Cl.
*B60R 1/06* (2006.01)
*G01S 17/08* (2006.01)
*G02B 27/00* (2006.01)
*G02B 27/09* (2006.01)

(52) U.S. Cl.
CPC .......... *G01S 17/08* (2013.01); *G02B 27/0006* (2013.01); *G02B 27/0955* (2013.01)

(58) Field of Classification Search
CPC . G01S 17/08; G02B 27/0006; G02B 27/0955; G02B 1/00; G02B 1/10; G02B 1/14; G02B 1/18

USPC .......................... 356/4.01; 359/507, 513, 511
See application file for complete search history.

(56) References Cited

U.S. PATENT DOCUMENTS 10,315,405 B2 *  6/2019  DeFillipi ............... B32B 37/153

FOREIGN PATENT DOCUMENTS

BR  112016008997 B1 *  9/2021
EP  0285490 A1 *  10/1988
KR  20120134532 A *  12/2012

OTHER PUBLICATIONS

U.S. Appl. No. 15/943,046, filed Apr. 2, 2018, Gross et al.

* cited by examiner

*Primary Examiner* — Arnel C Lavarias

(57) ABSTRACT

A tool for applying a protective film to a lens of a light detection and ranging (LIDAR) sensor is disclosed. The tool includes at least one cover, a film spindle, a film roller, and a pivot bar. The at least one cover has an elongated shape with a first end and a second end opposite of the first end. The film spindle is mounted to the at least one cover adjacent to the second end thereof. The film spindle is configured to hold a roll of the protective film. The film roller is mounted to the at least one cover adjacent to the first end thereof. The film roller is configured to apply the protective film onto the lens. The pivot bar has a first end configured to be pivotally attached to the LIDAR sensor and a second end pivotally attached to the at least one cover.

14 Claims, 6 Drawing Sheets

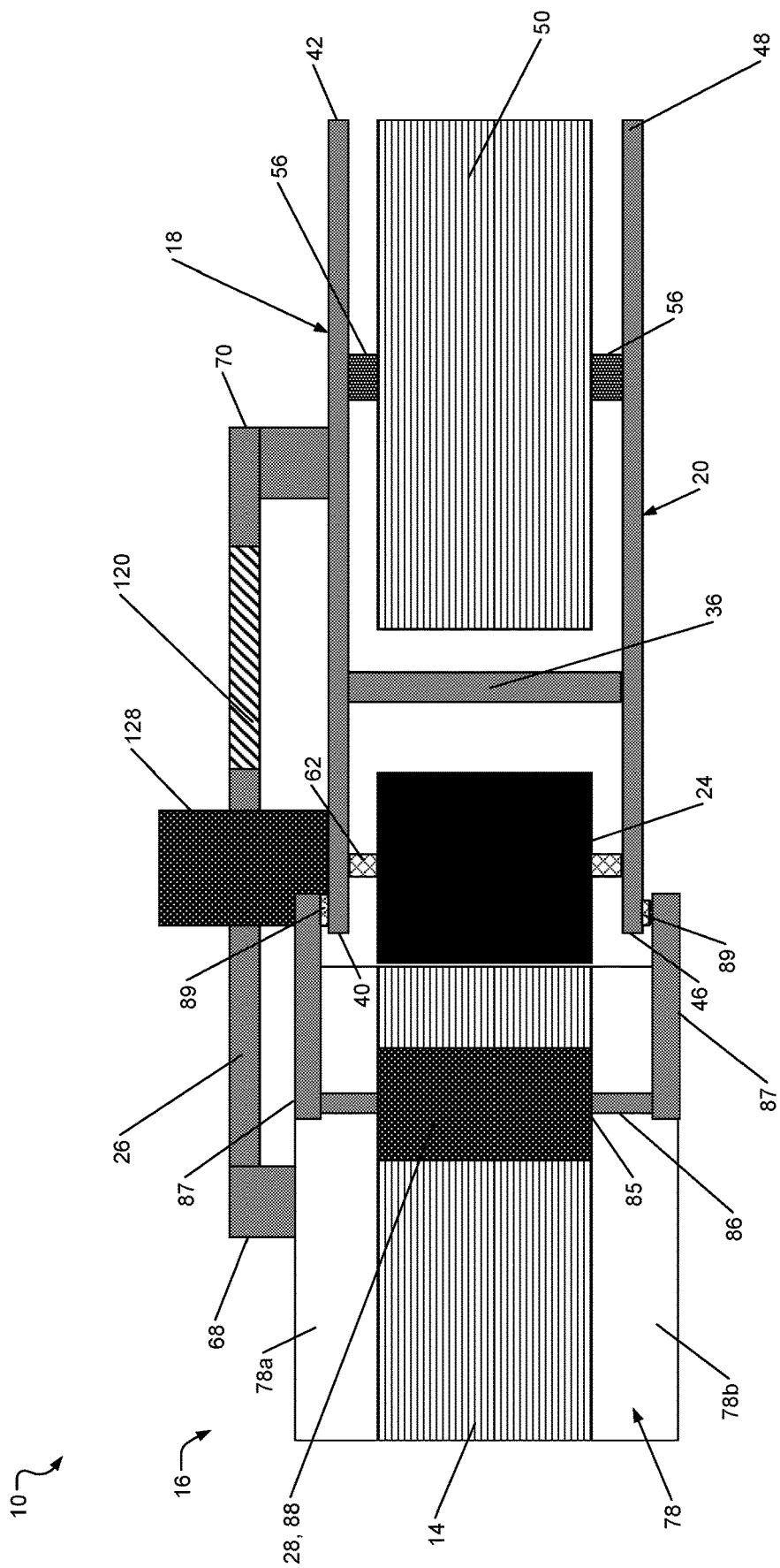

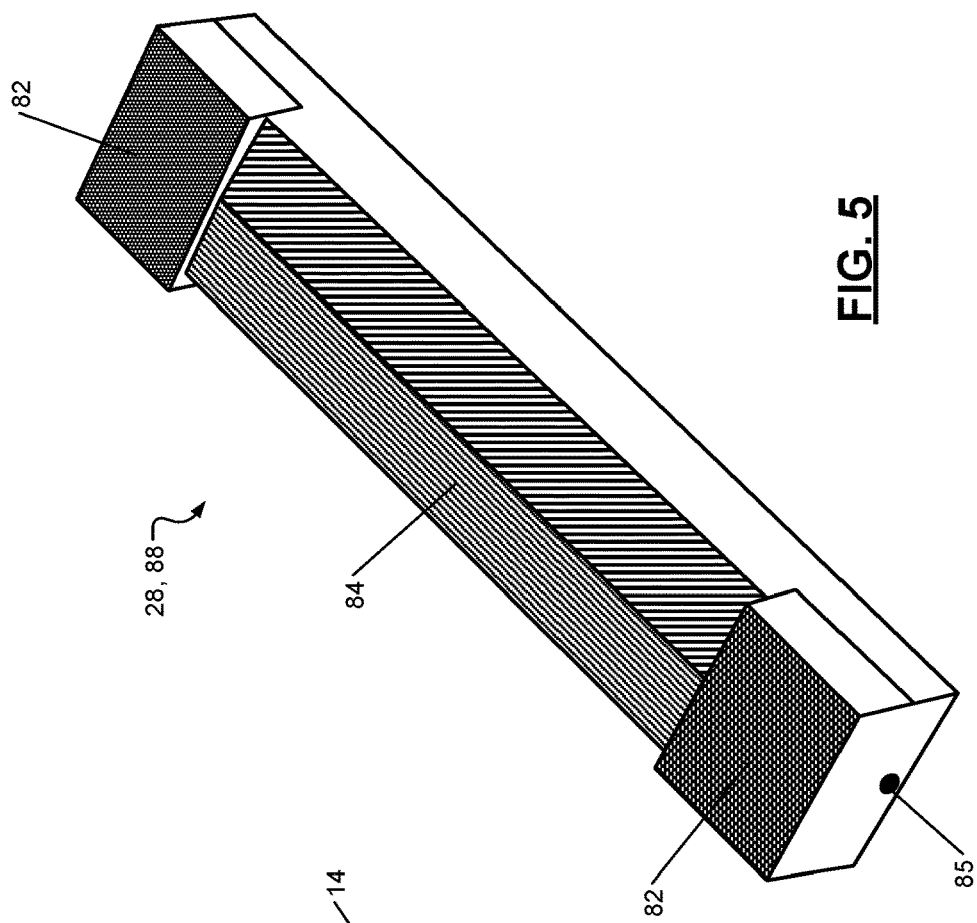
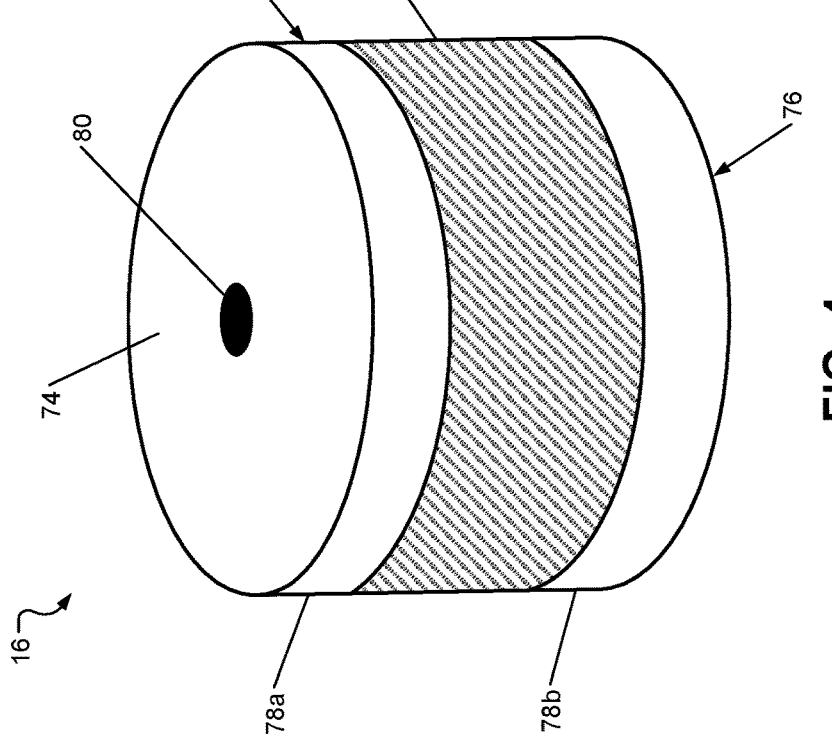

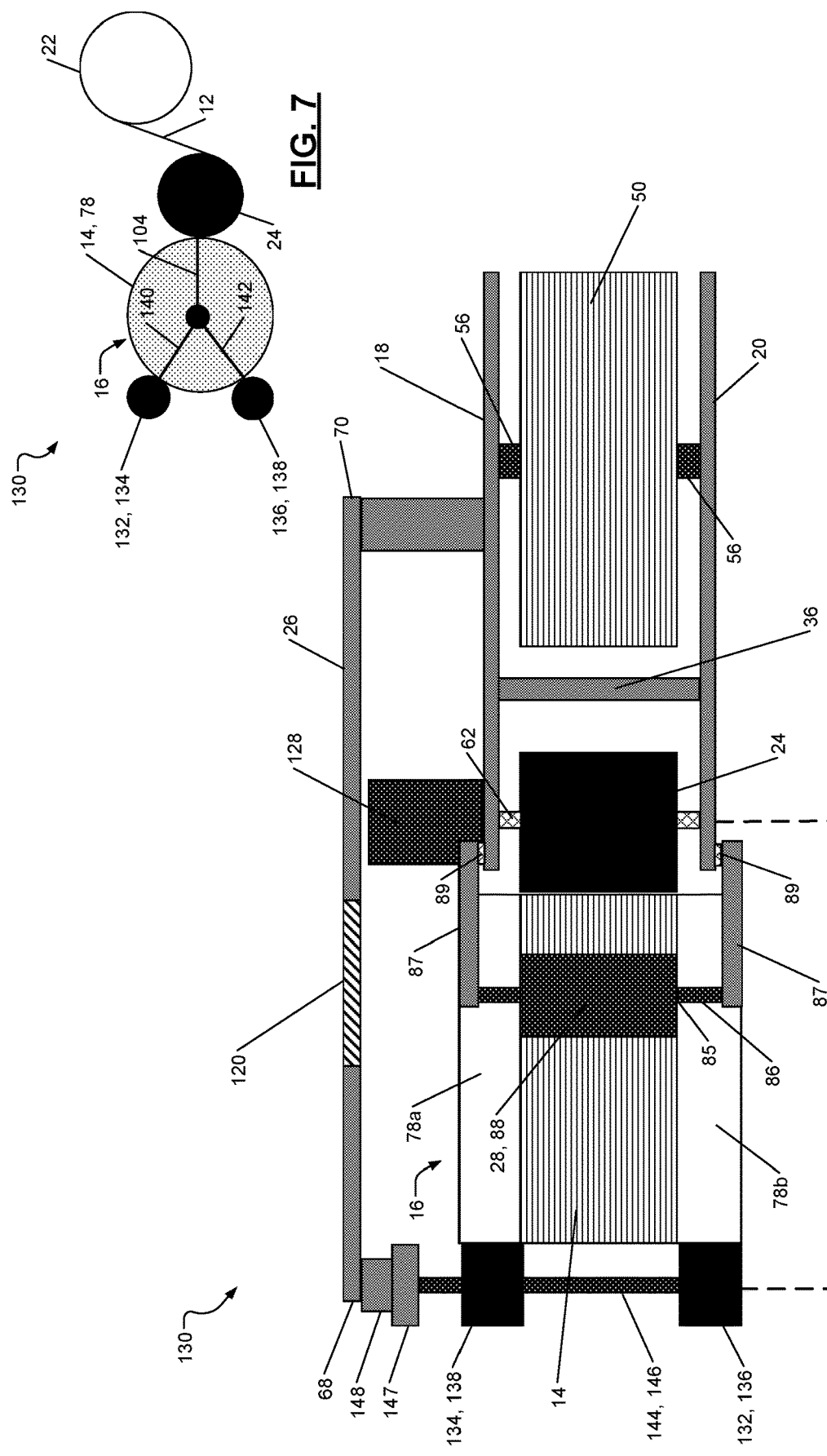

TOOL FOR APPLYING A PROTECTIVE FILM TO A LENS OF A LIDAR SENSOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a tool for applying a protective film to a lens of a light detection and ranging (LIDAR) sensor.

LIDAR sensors measure the distance to a target object by illuminating the target object with a pulsed laser light and measuring the return times and wavelengths of the reflected laser pulses. Differences in the return times and wavelengths of the laser pulses can be used to make digital three-dimensional representations of the target object. LIDAR sensors are installed on vehicles to assess the environment around a vehicle for autonomous driving systems and intelligent driver assistance systems.

LIDAR sensors are occasionally cylindrical with a flat top surface, a flat bottom surface, and a curved perimeter surface. LIDAR sensors typically include a lens that detects laser pulses reflected by a target object, and the lens extends around the perimeter surface. If a LIDAR sensor is installed on a vehicle, the lens of the LIDAR sensor may become dirty or damaged due to dust or debris contacting the lens. In addition, if the lens is regularly exposed to washer fluid, methanol in the washer fluid may crack the lens. If the lens become dirty or damaged, the LIDAR sensor may not accurately measure the distance to a target object.

SUMMARY

A first example of a tool for applying a protective film to a lens extending around a perimeter surface of a light detection and ranging (LIDAR) sensor having a cylindrical body is disclosed. The tool includes at least one cover, a film spindle, a film roller, and a pivot bar. The at least one cover has an elongated shape with a first end and a second end opposite of the first end. The film spindle is mounted to the at least one cover adjacent to the second end thereof. The film spindle is configured to hold a roll of the protective film. The film roller is mounted to the at least one cover adjacent to the first end thereof. The film roller is configured to apply the protective film onto the lens. The pivot bar has a first end configured to be pivotally attached to the LIDAR sensor and a second end pivotally attached to the at least one cover.

In one example, the pivot bar has a length that is adjustable to adjust a distance between the second end of the pivot bar and the perimeter surface of the LIDAR sensor.

In one example, the tool further includes a torsion device configured to apply a torsional force to the least one cover to bias the film roller against the perimeter surface of the LIDAR sensor.

In one example, the tool further includes an electric motor operable to rotate the film roller relative to the at least one cover and thereby rotate the tool around the perimeter surface of the LIDAR sensor to apply the protective film onto the lens.

In one example, the tool further includes a paddle pivotally attached to the at least one cover and configured to apply pressure to the perimeter surface of the LIDAR sensor to eliminate wrinkles in the protective film.

In one example, the tool further includes a lens cleaning device pivotally attached to the at least one cover and configured to clean the perimeter surface of the LIDAR sensor before the film roller applies the protective film to the lens.

In one example, the tool further includes an ultraviolet (UV) adhesive cure lamp pivotally attached to the at least one cover and configured to cure UV adhesive disposed between the protective film and the perimeter surface of the LIDAR sensor.

In one example, the tool further includes a film cutter pivotally attached to the at least one cover and configured to cut the protective film.

In one example, the tool further includes a position sensor configured to measure a rotational position of the film roller, and a control module configured to actuate the film cutter to cut the protective film based on the rotational position of the film roller.

In one example, the tool further includes a UV adhesive dispenser pivotally attached to the at least one cover and configured to apply a UV adhesive to the perimeter surface of the LIDAR sensor.

In one example, the at least one cover includes a top cover and a bottom cover, and the tool further includes a stanchion extending between the top and bottom covers and rigidly connecting the top and bottom covers to one another.

A second example of a tool for applying a protective film to a lens extending around a perimeter surface of a LIDAR sensor having a cylindrical body is disclosed. The tool includes at least one cover, a film spindle, a film roller, a pivot bar, and a plurality of pinch rollers. The at least one cover has an elongated shape with a first end and a second end opposite of the first end. The film spindle is mounted to the at least one cover adjacent to the second end thereof. The film spindle is configured to hold a roll of the protective film. The film roller is mounted to the at least one cover adjacent to the first end thereof. The film roller is configured to apply the protective film onto the lens. The pivot bar has a first end and a second end opposite of the first end, the second end of the pivot bar being pivotally attached to the at least one cover. The plurality of pinch rollers are pivotally attached to the first end of the pivot bar. The film roller and the plurality of pinch rollers are configured to engage the perimeter surface of the LIDAR sensor at different locations to mount the tool to the LIDAR sensor.

In one example, the plurality of pinch rollers include a first pair of pinch roller configured to be disposed at a first angular position on the perimeter surface of the LIDAR sensor, and a second pair of pinch rollers configured to be disposed at a second angular position on the perimeter surface of the LIDAR sensor.

In one example, the pivot bar has a length that is adjustable to adjust a distance between the second end of the pivot bar and the perimeter surface of the LIDAR sensor.

In one example, the tool further includes a torsion device configured to apply a torsional force to the at least one cover to bias the film roller against the perimeter surface of the LIDAR sensor.

In one example, the tool further includes an electric motor operable to rotate the film roller relative to the at least one cover and thereby rotate the tool around the perimeter surface of the LIDAR sensor.

In one example, the at least one cover includes a top cover and a bottom cover, and the tool further includes a stanchion extending between the top and bottom covers and rigidly connecting the top and bottom covers to one another.

A third example of a tool for applying a protective film to a lens extending around a perimeter surface of a LIDAR sensor having a cylindrical body is disclosed. The tool includes a top cover, a bottom cover, a film spindle, a film roller, a pivot bar, a torsion device, a paddle, a lens cleaning device, and a UV adhesive cure lamp. Each of the top and bottom covers has an elongated shape with a first end and a second end opposite of the first end. The film spindle is disposed between the top and bottom covers and is mounted to at least one of the top and bottom covers adjacent to the second end thereof. The film spindle is configured to hold a roll of the protective film. The film roller is disposed between the top and bottom covers and is mounted to at least one of the top and bottom covers adjacent to the first end thereof. The film roller is configured to apply the protective film onto the lens. The pivot bar has a first end configured to be pivotally attached to the LIDAR sensor, a second end pivotally attached to at least one of the top and bottom covers, and an adjustable length extending between the first and second ends. The torsion device is configured to apply a torsional force to at least one of the top and bottom covers to bias the film roller against the perimeter surface of the LIDAR sensor. The paddle is pivotally attached to at least one of the top and bottom covers and is configured to apply pressure to the perimeter surface of the LIDAR sensor to eliminate wrinkles in the protective film. The lens cleaning device is pivotally attached to at least one of the top and bottom covers and is configured to clean the perimeter surface of the LIDAR sensor before the film roller applies the protective film to the lens. The UV adhesive cure lamp is pivotally attached to at least one of the top and bottom covers and is configured to cure UV adhesive disposed between the protective film and the perimeter surface of the LIDAR sensor.

In one example, the tool further includes an electric motor operable to rotate the film roller relative to the top and bottom covers and thereby rotate the tool around the perimeter surface of the LIDAR sensor.

In one example, the lens cleaning device is configured to engage the perimeter surface of the LIDAR sensor at a first angular position, the paddle is configured to engage the perimeter surface of the LIDAR sensor at a second angular position, and the film roller is configured to engage the perimeter surface of the LIDAR sensor at a third angular position located between the first and second angular positions.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a side view of the tool of FIG. 1 applying the protective film to the lens of the LIDAR sensor;

FIG. 4 is a perspective view of an example of the LIDAR sensor of FIG. 1;

FIG. 5 is a perspective view of an example of an adhesive dispenser that may be included with the tool of FIG. 1;

FIG. 6 is a side view of another example of tool according to the present disclosure applying a protective film to a lens of a LIDAR sensor;

FIG. 7 is a schematic top view of the tool of FIG. 6; and

In the drawings, reference numbers may be reused to identify similar and/or identical elements.

DETAILED DESCRIPTION

Figure 1:
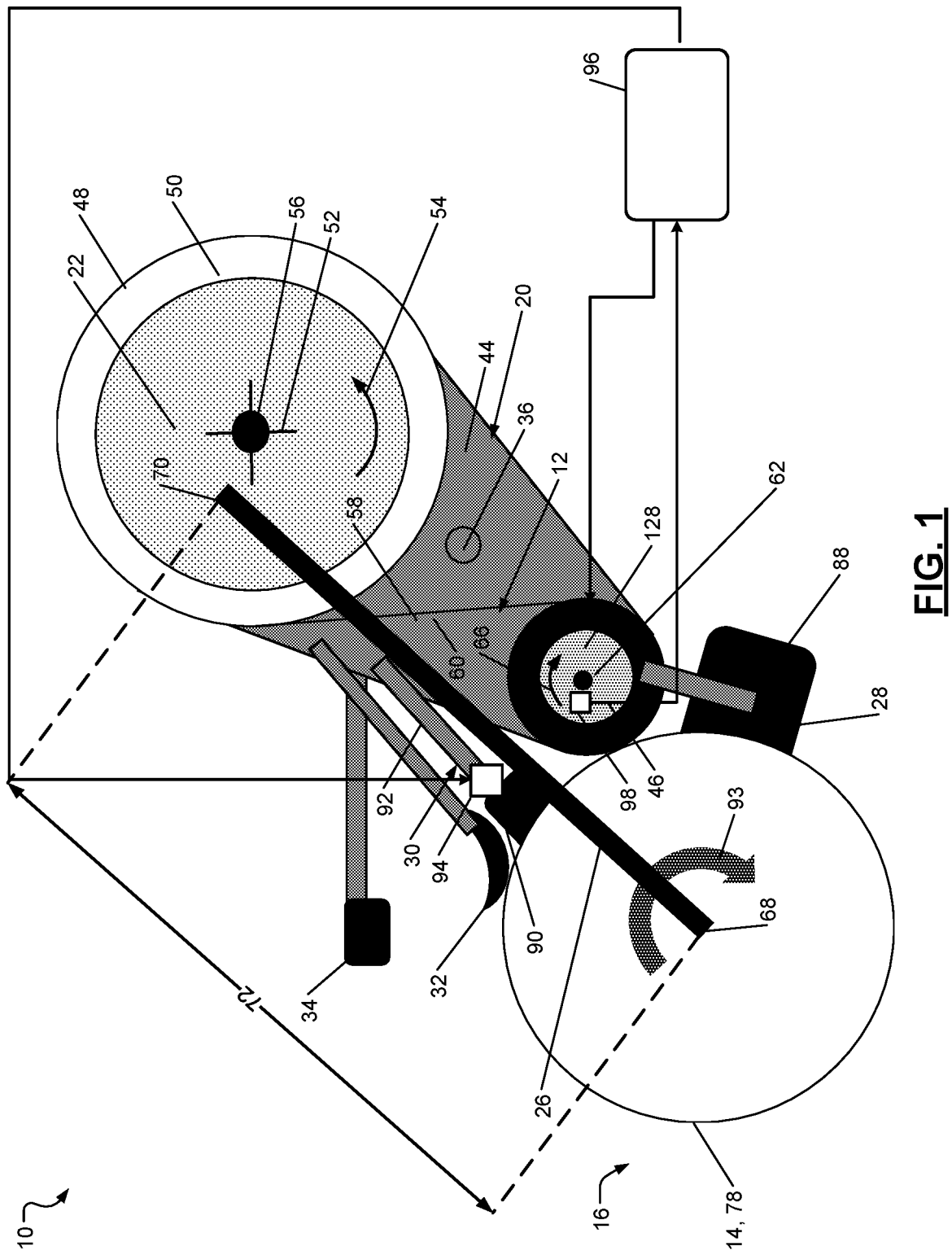
FIG. 1 is a top view of an example of a tool according to the present disclosure applying a protective film to a lens of a LIDAR sensor, with a top cover of the tool omitted to show a bottom cover of the tool.

A protective film may be applied to the lens of a LIDAR sensor to prevent damage to the lens, and the film may be removed and replaced when the film becomes dirty. Thus, the film may be used to ensure that the LIDAR sensor accurately measures the distance to all target objects. The film may be applied manually (i.e., by hand) to the lens. However, when manually applying the film to the curved surface of the lens while the LIDAR sensor is attached to a vehicle, it is difficult to ensure that the film remains aligned with the lens and that no wrinkles develop in the film. Wrinkles in the film may reduce the accuracy and/or resolution of the LIDAR sensor.

A film application tool according to the present disclosure enables automatic application, or semi-automatic application, of the film to the lens of a LIDAR sensor. The tool includes a film spindle that holds a roll of the protective film, a film roller that guides the film from the roll to the lens, one or more covers that hold the film spindle and the film roller, and a pivot bar that pivotally mounts the tool to the LIDAR sensor. The tool is rotated around the perimeter surface of the LIDAR sensor to apply the film to the lens. In one example, the tool includes an electric motor that rotates the film roller and thereby rotates the tool around the perimeter surface of the LIDAR sensor. In another example, the tool includes a handle that can be used to manually rotate the tool around the perimeter surface of the LIDAR sensor.

In one example, the tool further includes a lens cleaning device, a paddle, and an adhesive cure lamp that are pivotally mounted to one or both of the covers. The lens cleaning device cleans the lens before the film is applied to the lens. The paddle applies pressure to the film to prevent or eliminate wrinkles in the film. The adhesive cure lamp cures adhesive disposed between the film and the lens. The adhesive may be applied to the film before the film is wound onto the roll. Alternatively, liquid adhesive may be applied to the lens by an adhesive dispenser, which may be incorporated into the lens cleaning device.

In one example, the LIDAR sensor is pivotally mounted to the LIDAR sensor by inserting a distal end of the pivot bar into a hole in the top surface of the LIDAR sensor, and attaching the proximal end of the pivot bar to one of the covers using a revolute joint. In another example, pinch rollers are attached to the distal end of the pivot bar, and the LIDAR sensor is pivotally mounted to the LIDAR sensor by clamping the LIDAR sensor between the pinch rollers and the film roller. In either example, the length of the pivot bar is adjustable to accommodate LIDAR sensors having different diameters. In addition, the pivot bar and the covers accurately and precisely locate the film roller relative to the lens, which ensure that the film remains aligned with the lens as the film is applied to the lens.

Referring now to FIGS. 1-4, a film application tool 10 is shown applying a protective film 12 to a lens 14 of a light detection and ranging (LIDAR) sensor 16. The tool 10 includes a top cover 18, a bottom cover 20, a film spindle 22, a film roller 24, a pivot bar 26, a lens cleaning device 28, a film cutter 30, a paddle 32, and an adhesive cure lamp 34. The tool 10 may also include one or more supports or stanchions 36 extending between the top and bottom covers 18 and 20 and rigidly connecting the top and bottom covers 18 and 20 to one another. Each of the stanchions 36 may be a hollow shaft that accepts one or more screws inserted through the top and bottom covers 18 and 20 and/or into the stanchions 36. The top cover 18, the bottom cover 20, and the stanchions 36 may be made from plastic and/or integrally formed (e.g., molded) as a single piece in a single operation.

The top cover 18 includes a relatively flat plate 38 having an elongated shape with a first end 40 and a second end 42 opposite of the first end 40. Similarly, the bottom cover 20 includes a relatively flat plate 44 having an elongated shape with a first end 46 and a second end 48 opposite of the first end 46. The elongated shapes of the flat plates 38, 44 may be identical to one another.

In various implementations, the top cover 18 may include a wall (not shown) that projects from the flat plate 38 toward the bottom cover 20 and extends around the entire perimeter of the flat plate 44 or one or more discrete portions thereof. Additionally or alternatively, the bottom cover 20 may include a wall (not shown) that projects from the flat plate 44 toward the top cover 18 and extends around the entire perimeter of the flat plate 44 or one or more discrete portions thereof. In these implementations, the top and bottom covers 18 and 20 can be attached to one another using fasteners, friction welding, and/or adhesive at locations where the wall(s) of the top and bottom covers 18 and 20 abut one another or abut the flat plate 38 or 44 of the other one of the top and bottom covers 18 and 20. Also, in these implementations, the stanchions 36 may be omitted.

The film spindle 22 extends between the top and bottom covers 18 and 20 and is mounted to the top and bottom covers 18 and 20 adjacent to the second ends 42, 48 thereof. The film spindle 22 is mounted to the top and bottom covers 18 and 20 in a manner that allows rotation of the film spindle 22 relative to the top and bottom covers 18 and 20. In one example, the film spindle 22 is mounted to the top and bottom covers 18 and 20 using bearings and/or bushing sleeves disposed between the film spindle 22 and corresponding holes in the top and bottom covers 18 and 20. The film spindle 22 holds a roll 50 of the film 12, and the film spindle 22 rotates about a rotational axis 52 in a first direction 54 as the film 12 is pulled from the roll 50. The film spindle 22 includes a cylindrical tube around which the film 12 is wound. The cylindrical tube may be made of plastic or cardboard. There may be an interference fit between the film spindle 22 and the roll 50 so that the film spindle 22 and the roll 50 rotate together.

The film spindle 22 may include spring-loaded buttons 56 that can be pressed inward to allow sliding the film spindle 22 between the top and bottom covers 18 and 20 for removal and replacement of the roll 50 of the film 12. The film spindle 22 may be inserted between the top and bottom covers 18 and 20 until the buttons 56 are aligned with the holes in the top and bottom covers 18 and 20. At that point, the buttons 56 snap into the holes in the top and bottom covers 18 and 20, which holds the film spindle 22 and the roll 50 in place while allowing the film spindle 22 and the roll 50 to rotate relative to the top and bottom covers 18 and 20 with minimal drag torque. In various implementations, the buttons 56 may be replaced with a bolt that pass through holes in the top and bottom covers 18 and 20 and through a hole in the film spindle 22 extending along the rotational axis 52 thereof. The bolt may be held in place using a nut, such as a lock nut, and/or a lock washer.

The film 12 may be made of fluorinated ethylene propylene (FEP). The film 12 has an inner surface 58 that faces the cylindrical tube when the film 12 is wound onto the roll 50 and an outer surface 60 that forms the exterior surface of the roll 50 when the film 12 is wound onto the roll 50. The inner surface 58 of the film 12 contacts the lens 14 of the LIDAR sensor 16 when the film 12 is applied to the lens 14. A pressure-sensitive adhesive (PSA), such as an ultraviolet (UV)-cured PSA, may be applied to the inner surface 58 of the film 12 before the film 12 is wound onto the roll 50. The PSA may not be applied to the outer surface 60 of the film 12, and therefore the outer surface 60 of the film 12 may act as a release liner for the inner surface 58 of the film 12.

The film roller 24 is disposed between the top and bottom covers 18 and 20 and is mounted to the top and bottom covers 18 and 20 adjacent to the first ends 40, 46 thereof. The film roller 24 is mounted to the top and bottom covers 18 and 20 in a manner that allows rotation of the film roller 24 relative to the top and bottom covers 18 and 20. In one example, the film roller 24 is a rubber cylinder with a hole extending through its center, and the film roller 24 is mounted to the top and bottom covers 18 and 20 using a roller shaft 62 that extends through the hole in the film roller 24 and through corresponding holes in the top and bottom covers 18 and 20. The film roller 24 may be fixed to the roller shaft 62 using an interference fit between the hole in the film roller 24 and the roller shaft 62. In addition, bearings and/or bushing sleeves may be disposed between the roller shaft 62 and the corresponding holes in the top and bottom covers 18 and 20. The film roller 24 rotates about a rotational axis in a second direction 66 as the film roller 24 guides the film 12 onto the lens 14 of the LIDAR sensor 16 from the roll 50 of the film 12 on the film spindle 22. The second direction 66 is of the same as the first direction 54.

The pivot bar 26 has a first end 68, a second end 70 opposite of the first end 68, and a length 72 extending between the first and second end 68 and 70. The first end 68 of the pivot bar 26 is pivotally attached to the LIDAR sensor 16, and the second end 70 of the pivot bar 26 is pivotally attached to the top cover 18 and/or the bottom cover 20. The first end 68 of the pivot bar 26 may be pivotally attached to the LIDAR sensor 16 using a bearing and/or a bushing sleeve disposed between the first end 68 and a hole in the LIDAR sensor 16. For example, with particular reference to FIG. 4, the LIDAR sensor 16 has a top surface 74, a bottom surface 76 opposite of the top surface 74, a perimeter surface 78 around which the lens 14 extends, and a blind hole 80 extending through the top surface 74 at the center of the LIDAR sensor 16. The blind hole 80 may be threaded. The first end 68 of the pivot bar 26 may be inserted into the blind hole 80 of the LIDAR sensor 16, and the bearing and/or the bushing sleeve may be located in the blind hole 80 between the first end 68 of the pivot bar 26 and the LIDAR sensor 16. The second end 70 of the pivot bar 26 may be pivotally attached to the top cover 18 and/or the bottom cover 20 using a bearing and/or a bushing sleeve disposed between the second end 70 and a corresponding hole in the top and/or bottom covers 18 and/or 20.

Referring still to FIGS. 1-4, the lens cleaning device 28 is pivotally attached to the top cover 18 and/or the bottom cover 20 and cleans the perimeter surface 78 of the LIDAR sensor 16 before the film roller 24 applies the film 12 to the lens 14. With additional reference to FIG. 5, the lens cleaning device 28 includes a pair of pads 82 that engage portions 78a, 78b of the perimeter surface 78 of the LIDAR sensor 16 disposed on opposite sides of the lens 14, and a wiper 84 that engages the lens 14. The pads 82 ensure that the lens cleaning device 28 is properly aligned with the lens 14. The wiper 84 smooths liquid adhesive applied to the lens 14. The lens cleaning device 28 may also include tubing or channels (not shown) to allow cleaning fluid to flow through the lens cleaning device 28 and onto the lens 14. The lens cleaning device 28 defines a hole 85 that extends therethrough across the width thereof.

With particular reference to FIG. 3, the lens cleaning device 28 may be pivotally attached to the top and bottom covers 18 and 20 using a shaft 86 that extends through the hole 85 in the lens cleaning device 28, a pair of pivot arms 87 that connect the shaft 86 to the top and bottom covers 18 and 20, and pins 89 that pivotally attach the pivot arms 87 to the top and bottom covers 18 and 20. The pins 89 may extend through the pivot arms 87 and through corresponding holes the top and bottom covers 18 and 20. Bearings and/or bushing sleeves may be located between the pins 89 and the corresponding holes in the top and bottom covers 18 and 20 to allow the pivot arms 87 to pivot relative to the top and bottom covers 18 and 20. In various implementations, the shaft 86 and the pivot arms 87 may be integrally formed as a single piece in a single operation.

Referring again to FIGS. 1-5, the lens cleaning device 28 may include an adhesive dispenser 88, such as a wet/drawdown bar, which applies a liquid adhesive, such as a UV adhesive, to the perimeter surface 78 of the LIDAR sensor 16. In various implementations, the adhesive dispenser 88 may be separate from the lens cleaning device 28, and may be pivotally attached to the top cover 18 and/or the bottom cover 20 independent of the lens cleaning device 28. If the tool 10 includes the adhesive dispenser 88, adhesive may not be applied to the outer surface 60 of the film 12 before the film 12 is wound onto the roll 50. If the tool 10 does not include the adhesive dispenser 88, the lens cleaning device 28 may not include the wiper 84.

The film cutter 30 is pivotally attached to the top cover 18 and/or the bottom cover 20 and is rotatable toward the perimeter surface 78 of the LIDAR sensor 16 to cut the film 12. The film cutter 30 includes a cutting blade 90 and a pivot arm 92 that holds the cutting blade 90. The pivot arm 92 may be pivotally attached to the top and/or bottom covers 18 and/or 20 using a pin (not shown) that extends through the pivot arm 92 and through the top and/or bottom covers 18 and/or 20.

The film cutter 30 may be used to cut the film 12 when the film roller 24 has completed a single rotation around the perimeter surface 78 of the LIDAR sensor 16 while applying the film 12 to the lens 14. The film cutter 30 may cut the film 12 at the angular position on the perimeter surface 78 of the LIDAR sensor 16 where the film roller 24 started applying the film 12 so that the ends of the film 12 applied to the lens 14 are line-to-line but not overlapping. The film cutter 30 may also be used to remove a segment of the film 12 that is applied to a portion of the lens 14 that is untreated by the lens cleaning device 28 and the adhesive dispenser 88. A segment of the film 12 may be applied to an untreated portion of the lens 14 because the film roller 24 is located aft of the lens cleaning device 28 and the adhesive dispenser 88 in a third direction 93 in which the tool 10 rotates around the LIDAR sensor 16.

The tool 10 also includes an actuator 94 that moves the cutting blade 90 of the film cutter 30 radially toward the perimeter surface 78 of the LIDAR sensor 16 to cut the film 12 in response to an electronic signal generated by a control module 96. In one example, the film cutter 30 includes pads similar to the pads 82 on the lens cleaning device 28 that engage the portions 78a, 78b of the perimeter surface 78, and the actuator 94 extends the cutting blade 90 into the space between the pads 82 when the control module 96 instructs the film cutter 30 to cut the film 12. Otherwise, the actuator 94 retracts the cutting blade 90 so that the pads are the only part of the film cutter 30 engaging the perimeter surface 78. The actuator 94 may be a pneumatic actuator, an electric actuator, and/or a hydraulic actuator. The control module 96 may command the actuator 94 to actuate the film cutter 30 to cut the film 12 when the film roller 24 has completed a single rotation around the perimeter surface 78 of the LIDAR sensor 16 while applying the film 12 to the lens 14.

The control module 96 may determine when the film roller 24 has completed a single rotation around the perimeter surface 78 of the LIDAR sensor 16 based on the rotational position of the film roller, which may be measured by a position sensor 98. Additionally or alternatively, the control module 96 may determine when the film roller 24 has completed a single rotation around the perimeter surface 78 of the LIDAR sensor 16 based on the angular position of the pivot bar 26, which may be measured by a position sensor (not shown) located at the first end 68 of the pivot bar 26. The control module 96 may assume that the film roller 24 is applying the film 12 to the lens 14 when the film roller 24 is rotating and/or when the pivot bar 26 is pivoting around the LIDAR sensor 26. Alternatively, the tool 10 may include a button (now shown), and the control module 96 may determine that the film roller 24 is applying the film 12 to the lens 14 when the button is pressed by a user. In various implementations, the actuator 94, the control module 96, and the position sensor 98 may be omitted, and the film cutter 30 may be manually actuated by a user. A power supply (not shown) may supply power to the actuator 94, the control module 96, and the position sensor 98.

The paddle 32 is pivotally attached to the top cover 18 and/or the bottom cover 20 and applies pressure to the perimeter surface 78 of the LIDAR sensor 16 to eliminate wrinkles in the film 12. The paddle 32 may be pivotally attached to the top and/or bottom covers 18 and/or 20 using shafts or bars (not shown) that project from opposite sides of the paddle 32 and are attached to the top and/or bottom covers 18 and/or 20 via revolute joint. In one example, bearings and/or bushing sleeves are located between the bars supporting the paddle 32 and corresponding holes in the top and bottom covers 18 and 20 to allow the bars to rotate relative to the top and bottom covers 18 and 20.

The lens cleaning device 28 engages the perimeter surface 78 of the LIDAR sensor 16 at a first angular position 100. The paddle 32 engages the perimeter surface 78 of the LIDAR sensor at a second angular position 102. The film roller 24 engages the perimeter surface 78 of the LIDAR sensor 16 at a third angular position 104. The third angular position 104 is located between the first and second angular positions 100 and 102 along the perimeter surface 78 of the LIDAR sensor 16.

The adhesive cure lamp 34 is pivotally attached to the top cover 18 and/or the bottom cover 20 and emits heat and/or light toward the film 12 applied to the lens 14 to cure adhesive disposed between the film 12 and the lens 14. The adhesive cure lamp 34 may emit light toward the film 12 at an appropriate wavelength for the type of adhesive that is disposed between the film 12 and the perimeter surface 78 of the LIDAR sensor 16. For example, if a UV adhesive is disposed between the film 12 and the perimeter surface 78 of the LIDAR sensor 16, the adhesive cure lamp 34 may emit light having a wavelength between 10 nanometers and 400 nanometers.

Figure 2:
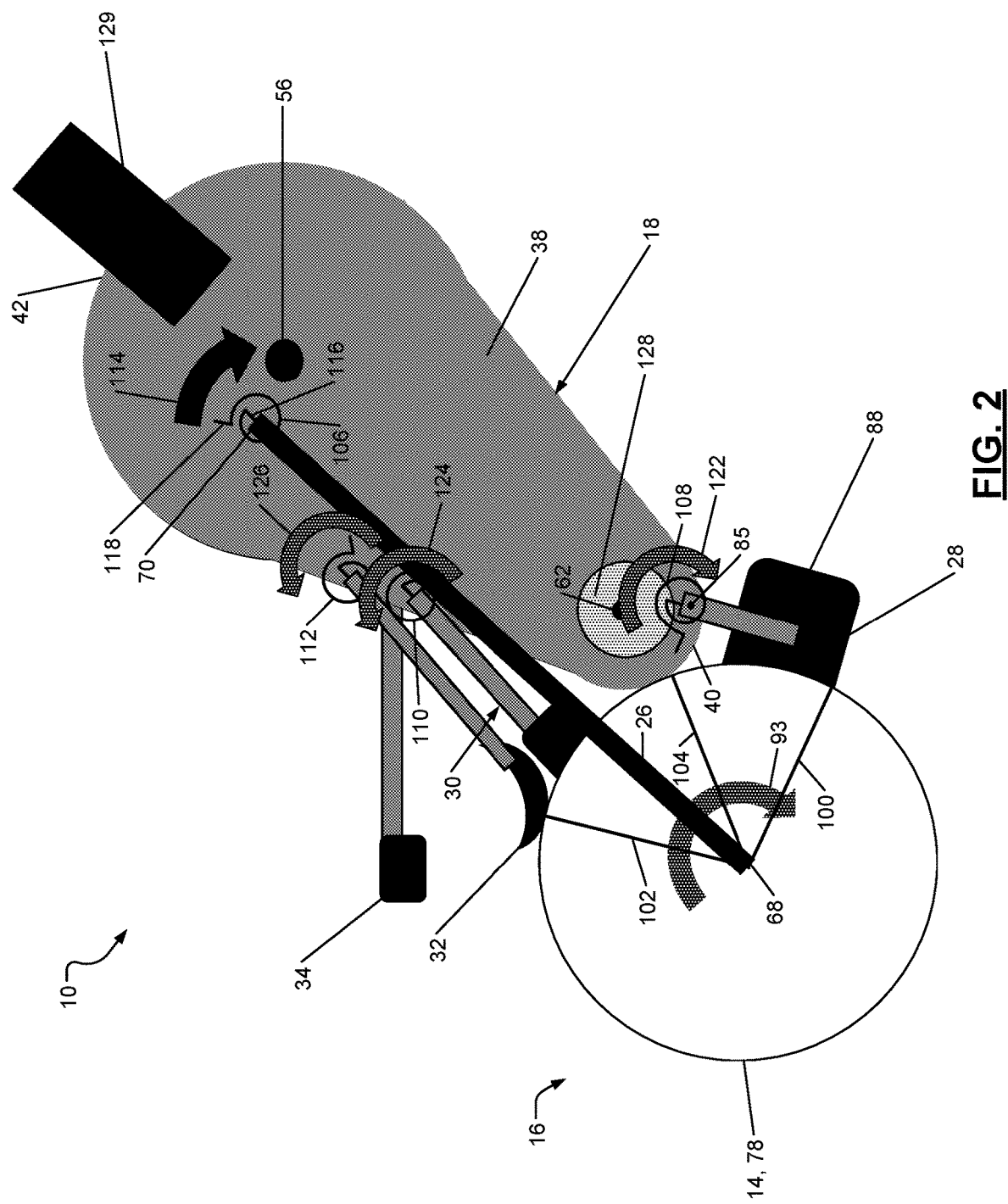
FIG. 2 is a top view of the tool of FIG. 1 applying the protective film to the lens of the LIDAR sensor, with the top cover of the tool in place.

With particular reference to FIG. 2, the tool 10 further includes a plurality of torsion devices, such as torsion springs, torsion bars, and/or straight springs that are offset from a pivot point, which bias various components of the tool 10 toward the perimeter surface 78 of the LIDAR sensor 16. In the example shown, the plurality of torsion devices include a torsion spring 106, a torsion spring 108, a torsion spring 110, and a torsion spring 112. The torsion spring 106 applies a torsional force to the top cover 18 to bias the film roller 24 against the perimeter surface 78 of the LIDAR sensor 16. In turn, the film roller 24 applies pressure to the film 12 as the film roller 24 guides the film 12 onto the lens 14, which prevents and/or eliminates wrinkles in the film 12. The torsion spring 106 applies the torsional force to the top cover 18 in a fourth direction 114.

The torsion spring 106 has a first end 116 and a second end 118 opposite of the first end 116. The first end 116 of the torsion spring 106 is attached to the second end 70 of the pivot bar 26. The second end 118 of the torsion spring 106 is attached to the top cover 18. In various implementations, the second end 118 of the torsion spring 106 may be attached to the bottom cover 20, and the torsion spring 106 may apply the torsional force to the bottom cover 20 in the fourth direction 114.

The length 72 of the pivot bar 26 is adjustable to adjust the distance between the second end 70 of the pivot bar 26 and the perimeter surface 78 of the LIDAR sensor 16, and thereby adjust the pressure applied to the lens 14 by the film roller 24. Referring briefly to FIG. 3, the pivot bar 26 includes a length adjustment device 120 that can be manipulated by hand to adjust the length 72 of the pivot bar 26. In one example, the length adjustment device 120 includes a first tube, a second tube within the first tube, and a set screw to lock the positions of the first and second tubes relative to one another. In another example, the length adjustment device includes a turnbuckle with one or more lock nuts.

Referring again to FIG. 2, the torsion spring 108 applies a torsional force to the lens cleaning device 28 in a fifth direction 122 to bias the lens cleaning device 28 against the perimeter surface 78 of the LIDAR sensor 16. In turn, the lens cleaning device 28 engages the perimeter surface 78 of the LIDAR sensor 16 as the lens cleaning device 28 cleans the lens 14 and, in various implementations, applies adhesive to the lens 14. This ensures that the lens cleaning device 28 cleans the lens 14 in a consistent and thorough manner. In addition, if the lens cleaning device 28 includes the adhesive dispenser 88, engaging the lens cleaning device 28 with the perimeter surface 78 of the LIDAR sensor 16 ensures that the adhesive dispenser 88 applies a uniform layer of adhesive. One end of the torsion spring 108 is attached to the lens cleaning device 28, and the other end of the torsion spring 108 is attached to the top cover 18.

The torsion spring 110 applies a torsional force to the film cutter 30 in a sixth direction 124 to bias the film cutter 30 against the perimeter surface 78 of the LIDAR sensor 16. The actuator 94 may act with the torsional force applied by the torsion spring 110 when the control module 96 commands the actuator 94 to actuate the film cutter 30. One end of the torsion spring 110 is attached to the film cutter 30, and the other end of the torsion spring 110 is attached to the top cover 18.

The torsion spring 112 applies a torsional force to the paddle 32 in a seventh direction 126 to bias the paddle 32 against the perimeter surface 78 of the LIDAR sensor 16. In turn, the paddle 32 applies pressure to the film 12, which eliminates wrinkles in the film 12. One end of the torsion spring 112 is attached to the paddle 32, and the other end of the torsion spring 112 is attached to the top cover 18.

The tool 10 also includes an electric motor 128 operable to rotate the film roller 24 relative to the top and bottom covers 18 and 20 and thereby rotate the tool 10 around the perimeter surface 78 of the LIDAR sensor 16 to apply the film 12 onto the lens 14. The film roller 24 and the rotating component(s) of the electric motor 128 are fixed to the roller shaft 62 using, for example, fasteners and/or an interference fit, which enables the electric motor 128 to rotate the film roller 24. In various implementations, the roller shaft 62 may be part of the electric motor 128 and referred to as a motor shaft.

The electric motor 128 may be bidirectional for unjamming purposes. Thus, the electric motor 128 may be operable to rotate the film roller 24 in the second direction 66 and in the direction opposite of the second direction 66. The housing of the electric motor 128 is rigidly attached to the top cover 18 using, for example, fasteners and/or an interference fit. In various implementations, the electric motor 128 may be omitted, and the tool 10 may be rotated in the third direction 93 around the perimeter surface 78 of the LIDAR sensor 16 using a handle 129 attached to the top cover 18.

The electric motor 128 may rotate the film roller 24 in response to an electronic signal generated by the control module 96. The tool 10 may include a load sensor (not shown) that measures the force applied by the film roller 24 to the perimeter surface 78 of the LIDAR sensor 16, and the control module 96 may rotate the film roller 24 when the force is greater than a predetermined force (indicating that the tool 10 is mounted to the LIDAR sensor 16). Alternatively, the tool 10 may include a button (not shown), and the control module 96 may rotate the film roller 24 when the button is pressed.

Referring now to FIGS. 6 and 7, a film application tool 130 is shown applying the film 12 to the lens 14 of the LIDAR sensor 16. The tool 130 may include one or more (e.g., all) of the components of the tool 10. However, in contrast to the tool 10, the pivot bar 26 of the tool 130 is not pivotally attached to the LIDAR sensor 16. Instead, the tool 130 includes a plurality of pinch rollers that are pivotally attached to the first end 68 of the pivot bar 26. The plurality of pinch rollers include a first pinch roller 132, a second pinch roller 134, a third pinch roller 136, and a fourth pinch roller 138. The film roller 24 and the pinch rollers 132, 134, 136, and 138 are configured to engage the perimeter surface 78 of the LIDAR sensor 16 at different locations to mount the tool 120 to the LIDAR sensor 16. Thus, the tool 130 is ideal for use when the LIDAR sensor 16 does not define the blind hole 80 used to mount the tool 10.

The first and second pinch rollers 132 and 134 are disposed at a fourth angular position 140 on the perimeter surface 78 of the LIDAR sensor 16. The third and fourth pinch rollers 136 and 138 are disposed at a sixth angular position 142 on the perimeter surface 78 of the LIDAR sensor 16. In addition, as indicated above, the film roller 24 is disposed at the third angular position 104 on the perimeter surface 78 of the LIDAR sensor 16. The angle between the fifth and sixth angular positions 140 and 142 may be an acute angle, the angle between the third and fifth angular positions 104 and 140 may be an obtuse angle, and the angle between the third and sixth angular positions 104 and 142 may be an obtuse angle.

The pinch rollers 132, 134, 136, and 138 pivotally attached to the first end 68 of the pivot bar 26 using a roller shaft 144, a roller shaft 146, a plate 147, and a revolute joint 148. The roller shaft 144 extends through the first and second pinch rollers 132 and 134, which are fixed to the roller shaft 144 using, for example, an interference fit. The roller shaft 146 extends through the third and fourth pinch rollers 136 and 138, which are fixed to the roller shaft 146 using, for example, an interference fit. Each of the roller shafts 144, 146 is pivotally attached to the plate 147 using, for example, bearings and/or bushing sleeves, and the plate 147 is pivotally attached to the first end 68 of the pivot bar 26 using the revolute joint 148.

When mounting the tool 130 to the LIDAR sensor 16, the length adjustment device 120 on the pivot bar 26 may be manipulated to adjust a distance 149 between the film roller 24 and the pinch rollers 132, 134, 136, and 138. This enables mounting the tool 130 to LIDAR sensor 16 with different diameters. For example, the length adjustment device 120 may be manipulated to increase the distance 149 if the diameter of the LIDAR sensor 16 is large, and the length adjustment device 120 may be manipulated to decrease the distance 149 if the diameter of the LIDAR sensor 16 is small.

Figure 8:
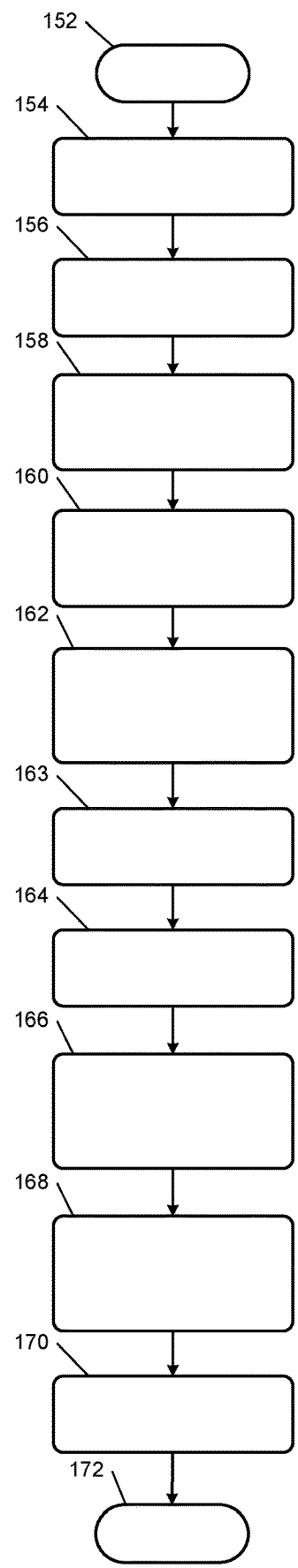
FIG. 8 is a flowchart illustrating an example method of applying a protective film to a lens of a LIDAR sensor according to the present disclosure.

Referring now to FIG. 8, a method of using the tools 10, 130 for applying the film 12 to the lens 14 of the LIDAR sensor 116 begins at 152. At 154, old protective film that was previously applied to the lens 14 is removed and the surface of the lens 14 is nominally cleaned. At 156, the tools 10, 130 are mounted to the LIDAR sensor 16. Mounting the tool 10 to the LIDAR sensor 16 involves inserting the first end 68 of the pivot bar 26 into the blind hole 80 in the top surface 72 of the LIDAR sensor 16. Mounting the tool 130 to the LIDAR sensor 16 involves positioning the film roller 24 and the pinch rollers 132, 134, 136, and 138 on opposite sides of the LIDAR sensor 16. When mounting either one of the tools 10 or 130, the length adjustment device 120 may be manipulated to adjust the length 72 of the pivot bar 26 and thereby adjust the pressure applied to the lens 14 by the film roller 24 and the paddle 32.

At 158, the tools 10, 130 are rotated in the third direction 93 around the perimeter surface 78 of the LIDAR sensor 16. The electric motor 128 may be used to rotate the tools 10, 130 in the third direction 93 around the perimeter surface 78 of the LIDAR sensor 16. Alternatively, the electric motor 128 may be omitted, and the tools 10, 130 may be manually rotated in the third direction 93 using the handle 129.

At 160, the lens cleaning device 28 of the tools 10, 130 cleans the lens 14 of the LIDAR sensor 16 as the tools 10, 130 rotate around perimeter surface 78 of the LIDAR sensor 16. If the lens cleaning device 28 includes the adhesive dispenser 88, the adhesive dispenser 88 applies adhesive to the lens 14 of the LIDAR sensor 16 as the tools 10, 130 rotate around perimeter surface 78 of the LIDAR sensor 16. The adhesive dispenser 88 may apply adhesive in a volume regulated, uniform or patterned layer.

At 162, the film roller 24 applies the film 12 to the surface of the lens 14 from the roll 50 on the film spindle 22. At the same time, the film roller 24 applies pressure to the film 12 to smooth out the film 12 with no bubbles or creases while keeping the film 12 aligned with the lens 14. At 164, the film cutter 30 passes over the film 12. The film cutter 30 may be used to cut the film 12 to remove a portion of the film 12 that is applied to a portion of the surface of the lens 14 that is untreated by the lens cleaning device 28. The film cutter 30 is typically used to cut the film 12 after the tool 10 has rotated at least one full rotation around the LIDAR sensor 16 to ensure that the film 12 extends 360 degrees around the perimeter surface 78 of the LIDAR sensor 16.

At 164, the paddle 32 applies pressure to the film 12 to smooth out the film 12. The paddle 32 may be omitted if the pressure applied by the film roller 24 is sufficient to prevent and/or eliminate wrinkles in the film 12. At 166, the adhesive cure lamp 34 passes over the film 12 and emits light and/or heat toward the film 12 to cure adhesive disposed between the film 12 and the lens 14. The light emitted by the adhesive cure lamp 34 may be a point source of light, or the light may be effective over an arc of rotation in order to ensure that there is enough exposure time to fully cure the adhesive.

At 168, rotation of the tools 10, 130 around the perimeter surface 78 of the LIDAR sensor 16 is stopped. If the tools 10, 130 include the electric motor 128, the control module 96 generates an electronic signal to command the electric motor 128 to stop rotating, which stops rotation of the tools 10, 130 around the perimeter surface 78 of the LIDAR sensor 16. If the tools 10, 130 do not include the electric motor 128, a user of the tools 10, 130 simply stops rotating the tools 10, 130 around the perimeter surface 78 of the LIDAR sensor 16. Once rotation of the tools 10, 130 is stopped, the tools 10, 130 may be removed from the LIDAR sensor 16 at 170, and the method ends at 172.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A tool for applying a protective film to a lens extending around a perimeter surface of a light detection and ranging (LIDAR) sensor having a cylindrical body, the tool comprising:
at least one cover having an elongated shape with a first end and a second end opposite of the first end;
a film spindle mounted to the at least one cover adjacent to the second end thereof, wherein the film spindle is configured to hold a roll of the protective film;
a film roller mounted to the at least one cover adjacent to the first end thereof, the film roller being configured to apply the protective film onto the lens; and
a pivot bar having a first end configured to be pivotally attached to the LIDAR sensor and a second end pivotally attached to the at least one cover.

2. The tool of claim 1 wherein the pivot bar has a length that is adjustable to adjust a distance between the second end of the pivot bar and the perimeter surface of the LIDAR sensor.

3. The tool of claim 1 further comprising a torsion device configured to apply a torsional force to the at least one cover to bias the film roller against the perimeter surface of the LIDAR sensor.

4. The tool of claim 1 further comprising an electric motor operable to rotate the film roller relative to the at least one cover and thereby rotate the tool around the perimeter surface of the LIDAR sensor to apply the protective film onto the lens.

5. The tool of claim 1 further comprising a paddle pivotally attached to the at least one cover and configured to apply pressure to the perimeter surface of the LIDAR sensor to eliminate wrinkles in the protective film.

6. The tool of claim 1 further comprising a lens cleaning device pivotally attached to the at least one cover and configured to clean the perimeter surface of the LIDAR sensor before the film roller applies the protective film to the lens.

7. The tool of claim 1 further comprising an ultraviolet (UV) adhesive cure lamp pivotally attached to the at least one cover and configured to cure UV adhesive disposed between the protective film and the perimeter surface of the LIDAR sensor.

8. The tool of claim 1 further comprising a film cutter pivotally attached to the at least one cover and configured to cut the protective film.

9. The tool of claim 8 further comprising:
 a position sensor configured to measure a rotational position of the film roller; and
 a control module configured to actuate the film cutter to cut the protective film based on the rotational position of the film roller.

10. The tool of claim 1 further comprising a UV adhesive dispenser pivotally attached to the at least one cover and configured to apply a UV adhesive to the perimeter surface of the LIDAR sensor.

11. The tool of claim 1 wherein the at least one cover includes a top cover and a bottom cover, and the tool further comprises a stanchion extending between the top and bottom covers and rigidly connecting the top and bottom covers to one another.

12. A tool for applying a protective film to a lens extending around a perimeter surface of a LIDAR sensor having a cylindrical body, the tool comprising:
 a top cover;
 a bottom cover, each of the top and bottom covers having an elongated shape with a first end and a second end opposite of the first end;
 a film spindle disposed between the top and bottom covers and mounted to at least one of the top and bottom covers adjacent to the second end thereof, wherein the film spindle is configured to hold a roll of the protective film;
 a film roller disposed between the top and bottom covers and mounted to at least one of the top and bottom covers adjacent to the first end thereof, the film roller being configured to apply the protective film onto the lens;
 a pivot bar having a first end configured to be pivotally attached to the LIDAR sensor, a second end pivotally attached to at least one of the top and bottom covers, and an adjustable length extending between the first and second ends;
 a torsion device configured to apply a torsional force to at least one of the top and bottom covers to bias the film roller against the perimeter surface of the LIDAR sensor;
 a paddle pivotally attached to at least one of the top and bottom covers and configured to apply pressure to the perimeter surface of the LIDAR sensor to eliminate wrinkles in the protective film;
 a lens cleaning device pivotally attached to at least one of the top and bottom covers and configured to clean the perimeter surface of the LIDAR sensor before the film roller applies the protective film to the lens; and
 a UV adhesive cure lamp pivotally attached to at least one of the top and bottom covers and configured to cure UV adhesive disposed between the protective film and the perimeter surface of the LIDAR sensor.

13. The tool of claim 12 further comprising an electric motor operable to rotate the film roller relative to the top and bottom covers and thereby rotate the tool around the perimeter surface of the LIDAR sensor.

14. The tool of claim 12 wherein:
 the lens cleaning device is configured to engage the perimeter surface of the LIDAR sensor at a first angular position;
 the paddle is configured to engage the perimeter surface of the LIDAR sensor at a second angular position; and
 the film roller is configured to engage the perimeter surface of the LIDAR sensor at a third angular position located between the first and second angular positions.

\* \* \* \* \*